UNITED STATES PATENT OFFICE.

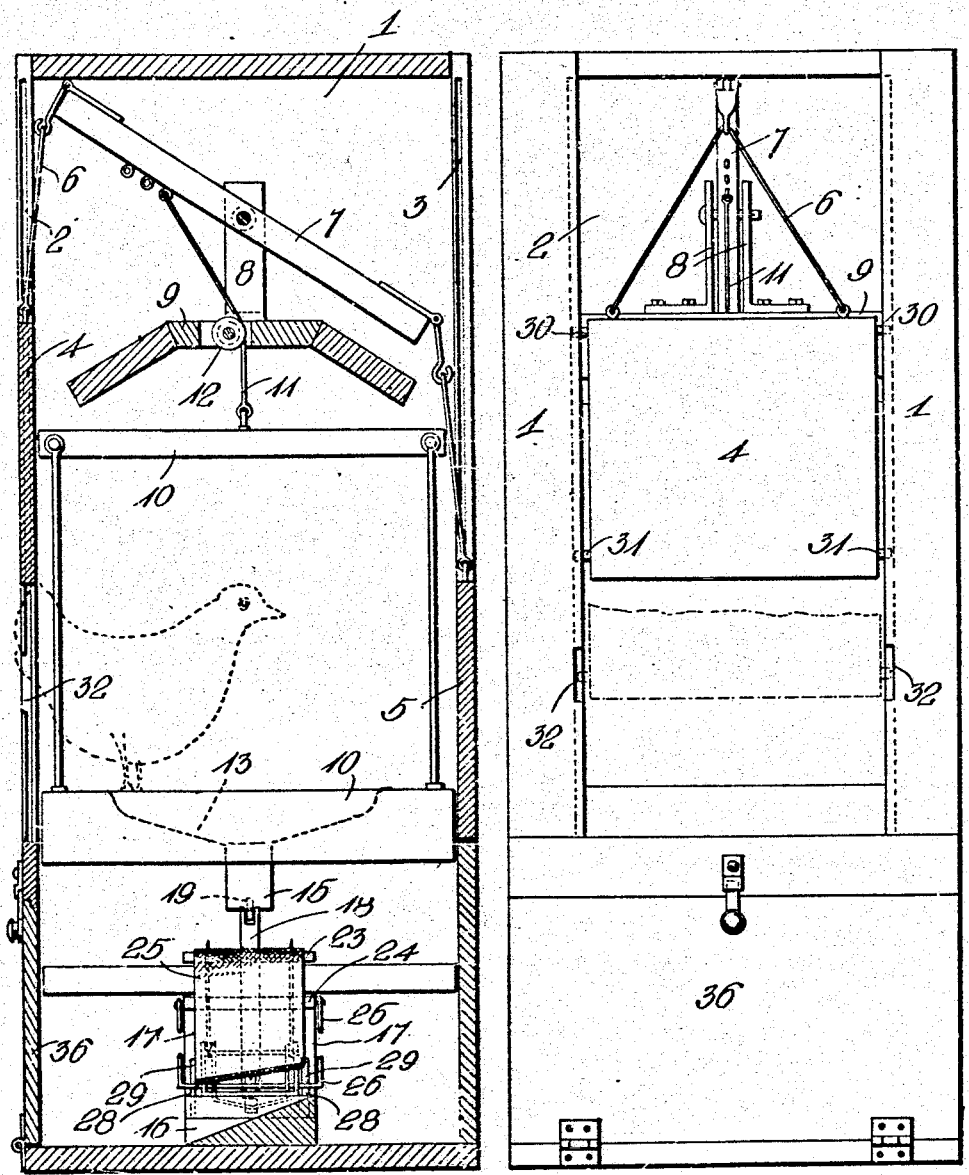

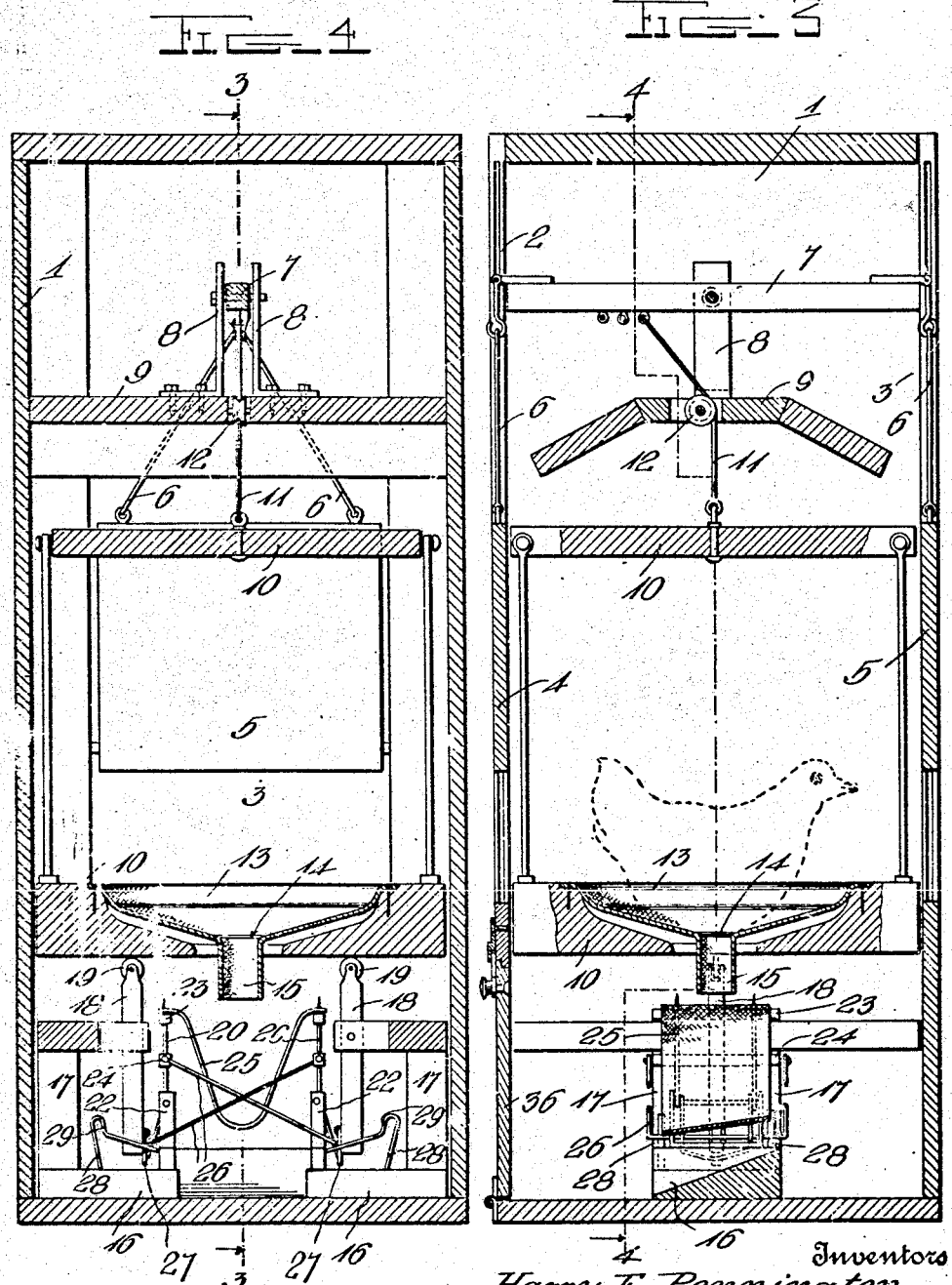

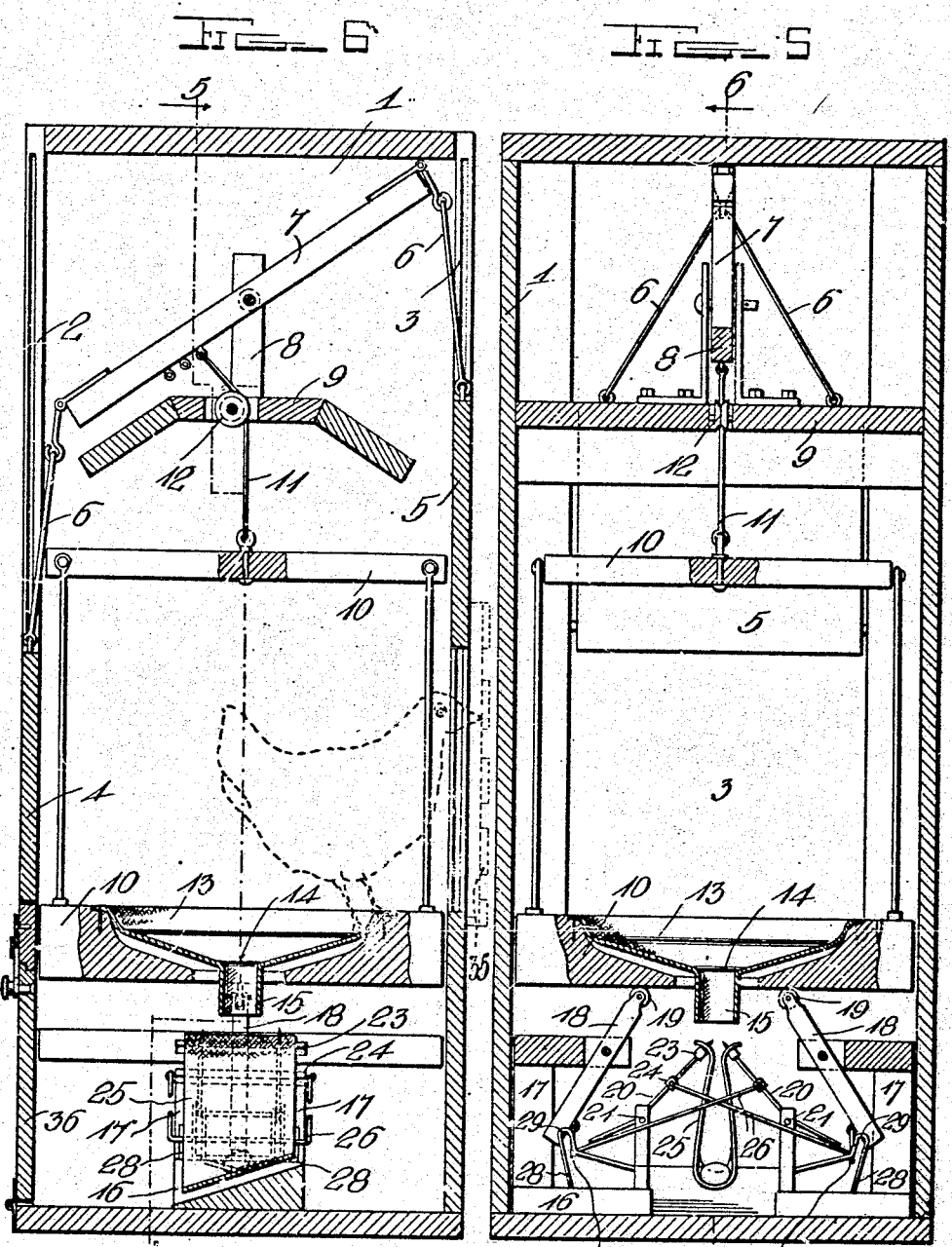

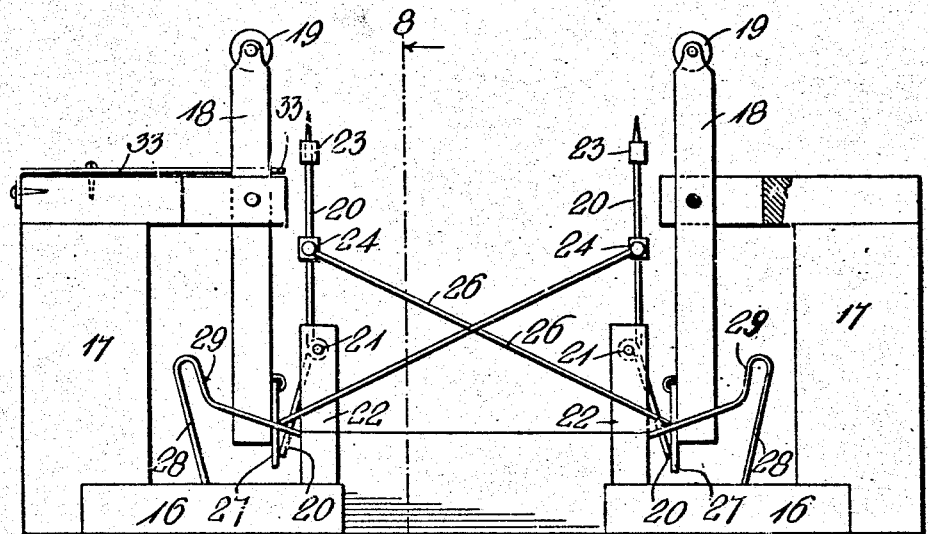
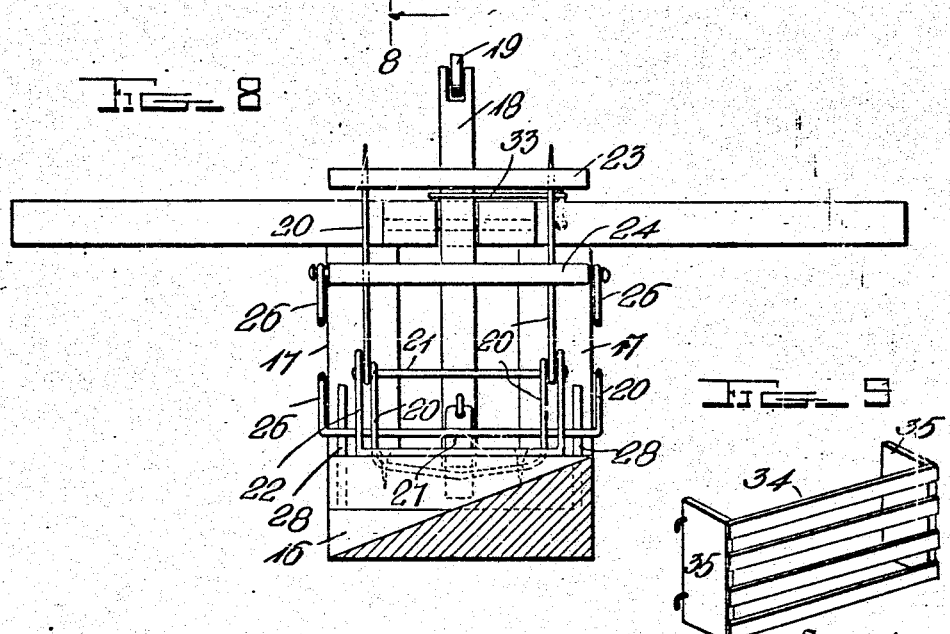

HARRY EVES PENNINGTON AND HERBERT W. RAYMOND, OF NORTH ABINGTON, MASSACHUSETTS.

TRAP-NEST.

971,401.   Specification of Letters Patent.   Patented Sept. 27, 1910.

Application filed February 8, 1910.  Serial No. 542,678.

*To all whom it may concern:*

Be it known that we, HARRY E. PENNINGTON and HERBERT W. RAYMOND, citizens of the United States, residing at North Abington, in the county of Plymouth and State of Massachusetts, have invented certain new and useful Improvements in Trap-Nests; and we do declare the following to be a full, clear, and exact description of the invention, such as will enable others skilled in the art to which it appertains to make and use the same.

This invention relates to improvements in trap nests.

One object of the invention is to provide a nest of this character which the fowl may enter and leave to return to the inclosure from which she came if she does not lay and from which, if she does lay, she cannot return to the inclosure from which she came, but will be permitted to leave the nest from the opposite side and to enter an inclosure other than the one from which she entered the nest, thereby automatically causing the separation of the fowls which have laid from those which have not laid.

Another object is to provide means for confining a fowl on the nest after she has laid and for preventing other fowls from entering the same nest, thereby providing for the identification of the fowl laying the egg.

With the foregoing and other objects in view, the invention consists of certain novel features of construction, combination and arrangement of parts as will be more fully described and particularly pointed out in the appended claims.

In the accompanying drawings, Figure 1 is a front view of a nest constructed in accordance with the invention and showing in full lines the normal position of the door or the position thereof before a fowl has entered the nest and showing in dotted lines the position of the door after the fowl has entered the nest; Fig. 2 is a central vertical section of the same; Fig. 3 is a similar view on the line 3—3 of Fig. 4 showing the position of the parts after the fowl has entered the nest but before the egg is laid; Fig. 4 is a vertical sectional view on the line 4—4 of Fig. 3; Fig. 5 is a similar view after the egg is laid and taken on the line 5—5 of Fig. 6, showing the manner in which the parts are operated by the egg to open one door and close the other door; Fig. 6 is a vertical sectional view on the line 6—6 of Fig. 5 showing in dotted lines the supplemental door for confining the fowl on the nest after she has laid; Fig. 7 is an enlarged detail side view of the nest supporting mechanism and the tripping mechanism connected therewith; Fig. 8 is a vertical cross section on the line 8—8 of Fig. 7; Fig. 9 is a detail perspective view of the supplemental door for confining the fowl on the nest.

In the embodiment of the invention we provide a suitable box or casing 1 which is preferably of rectangular form and is adapted to be set into a wall or partition separating the inclosure. Arranged in diametrically opposite sides of the casing 1 are door openings 2 and 3 through which the fowl is permitted to enter and leave the box.

In the edges of the openings 2 and 3 are formed guide grooves in which in the opening 2 is slidably mounted a door 4 and in the opening 3 is slidably mounted a door 5. The doors 4 and 5 are connected by straps or other flexible connections 6 to the opposite ends of a door opening lever 7, which is pivotally mounted on a post 8 arranged on a transverse partition 9 in the upper portion of the box or casing 1.

Arranged in the box or casing 1 is a nest frame 10 to the upper end of which is connected a supporting strap or cord 11 which passes over a guide pulley 12 journaled in the partition 9 and which is connected to one end of the lever 7 as shown. It will thus be seen that the nest frame 10 is suspended from the lever 7 by the cord 11, so that when said nest is moved up or down, the lever 7 will be rocked and the doors connected thereto will thus be operated by the movement of the nest frame. In the lower portion of the nest frame is arranged the nest 13 which is preferably formed of burlap or other suitable fabric, the edges of which are secured to the lower portion of the frame 10. The burlap or other material forming the nest is arranged to sag at the center to form a nest shaped hollow and in the center of the hollow portion of the nest is formed an egg discharge opening 14 with which is connected an egg discharging tube 15, through which the egg, when laid, will immediately fall from the nest into the lower portion of the box or casing wherein it is caught by a suitable receiving mechanism provided for the purpose, and which will be hereinafter more fully described.

Arranged in the lower portion of the box or casing 1 is a nest supporting and tripping mechanism comprising a base 16 to which adjacent to the opposite sides of the box are secured upwardly projecting standards 17 having right angular inwardly projecting extensions in which are pivotally mounted vertically disposed nest supporting bars 18 in the upper ends of which are revolubly mounted anti-friction rollers 19 upon which the nest frame rests when moved down by the weight of a fowl thereon.

Arranged between the bars 18 is an egg actuated tripping mechanism by means of which the bars 18 are tripped after an egg is laid to permit the further lowering of the nest frame. The tripping mechanism for the bars 18 is here shown and preferably consists of a pair of U-shaped trip levers 20, which are preferably formed of wire rods bent into the shape shown, said levers being pivotally mounted on bearing shafts 21 arranged in supporting brackets 22 secured to the base 16, as shown.

The upper portions of the levers 20 are connected together by upper and lower cross bars 23 and 24 and the upper ends of the levers are preferably pointed and with said pointed ends are adapted to be engaged the opposite ends of an egg-receiving hammock 25, which is preferably formed of a strip of burlap or similar flexible fabric and which is arranged to sag or form a loop between the levers 20, as shown. The hammock 25 is disposed below the discharge tube 15 of the nest so that the egg when laid will fall directly into the hammock.

To the opposite ends of the lower cross bars 24 are connected the upper ends of downwardly inclined oppositely projecting bail-shaped starting rods 26, the lower connected ends of which are adapted to engage extension plates 27 loosely connected to the lower ends of the nest supporting bars 18 as shown. The lower connected or loop-shaped ends of the rods 26 engage and slide upon upwardly inclined supporting and guiding frames 28 secured to the base 16, said frames having at their upper ends stops 29, which limit the upward movement of the starting rods 26. By means of a tripping mechanism constructed as herein shown and described, it will be seen that, when an egg is laid and drops into the hammock 25, the weight of the egg will pull down on the hammock causing the latter to rock the levers 20 or to swing the upper ends of the same together, thereby forcing the lower ends of the starting rods 26 outwardly and up the inclined guide frame 28, which movement of the rods 26 will trip the nest supporting bars 18, thus swinging the upper ends thereof inwardly and downwardly and permitting the nest to be moved downwardly by the weight of the fowl thereon.

By reference to the various figures of the drawings, it will be seen that before the fowl has entered the nest, the door 4 on one side of the box or casing is in an open position, while the door 5 at the opposite side of the casing is closed. In the operation of the device, as the fowl enters the nest, the latter will be lowered by the weight of the fowl until the lower portion of the nest frame engages the rollers in the upper ends of the supporting bars 18, as clearly shown in Fig. 4 of the drawing. This initial lowering of the nest frame by the weight of the fowl rocks the lever 7 to the position in Fig. 3, which will lower the door 4 and raise the door 5 to a slight extent as shown. The door 4 is thus lowered to a sufficient extent to prevent the entrance of any other fowls but it will be noted by reference to Fig. 1 that the door 4 is provided with guide pins 30 and 31, which enter and slide in the grooves formed in the edges of the opening 2 and that when the door is in its partially lowered position as shown in dotted lines in Fig. 1 and in full lines in Fig. 3, that the lower pins 31 of the door will be brought opposite to notches 32 cut in the outer sides of the edges of the opening 2, thereby permitting the lower portion of the door to be swung outwardly from the inside, thus allowing the fowl to leave the nest through the opening 2 by swinging the door outwardly unless the fowl has laid.

If the fowl, after entering the nest, has laid an egg, the latter will immediately drop through the discharge opening 14 and tube 15 and into the hammock 25, whereby the weight of the egg will actuate the tripping mechanism and cause the latter to trip the nest supporting bars 18, as hereinbefore described, thereby permitting the weight of the fowl to move the nest frame farther down, which movement of the frame will swing the door operating lever 7 to the position shown in Fig. 6, whereby the door 4 will be entirely closed and the door 5 opened to its full extent, thus permitting the fowl to readily leave the nest through the opening 3 and into a compartment other than that from which she entered the nest. It will thus be seen that fowls which have entered the nests and laid will be separated from the fowls which have not laid.

In order to cause the levers 18 and the tripping mechanism to resume their normal position after the nest has been again moved up to its normal position, we preferably provide a light wire spring 33 which is secured to the upper end of the standard 17 and one end of which is bent at right angles to engage the bar 18, at one side of the tripping mechanism. When this bar has been swung back by the spring 33, the other bar and parts of the tripping mechanism will be restored thereby to their normal positions.

If it should be desired to confine a fowl on the nest after she has laid an egg we provide a supplemental door 34, which is preferably formed of slats secured to end pieces 35. In using the door 34, the latter is placed across the opening 3 and the end pieces thereof engaged with suitable supporting devices arranged on the opposite sides of the box or casing 1, thereby removably supporting the door in place over the opening 3, which will prevent the fowl from leaving the nest after she has laid and the door 5 opened in the manner described. In thus confining the fowl to the nest, she may be identified as the fowl having laid the egg. It will be noted that in thus confining the fowl, she cannot reach or break the egg she has laid in the nest and dropped into the hammock below. It will be noted that the looped lower portion of the hammock 25 is disposed at an angle corresponding with the angle of inclination of the central portion of the base 16 of the nest supporting and tripping mechanism, whereby, as soon as an egg drops into the hammock, the weight of the falling egg will trip the nest supporting bars 18 as hereinbefore described, after which the egg will roll out of the inclined bottom of the hammock into the bottom of the casing, from which the eggs may be removed when desired through a suitable door 36 arranged in the lower portion of the casing as shown. After the hen leaves the nest, the parts will automatically resume their normal positions ready for the next hen to enter the nest.

It will thus be seen that the nest is operated entirely by the hen and that an egg has got to be laid before the hen can pass from one compartment to the other.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described our invention, what we claim is:—

1. In a device of the character described, a box or casing having formed therein an inlet and an exit opening, doors adapted to open and close said inlet and exit openings, a door operating lever pivotally mounted in said box, a nest frame connected to and suspended from said lever and adapted to actuate the latter to partially close one door and open the other when a fowl enters the box, a nest frame supporting mechanism adapted to receive and support the nest frame when a fowl has entered the box, and means to trip said nest supporting mechanism after an egg has been laid by the fowl on the nest thereby causing said nest frame to completely close the inlet door and open the exit door of the box.

2. In a device of the character described, a box or casing having formed therein an inlet opening and an exit opening, doors to open and close said openings, a nest frame suspended in said box, a door operating lever actuated by the movement of said nest frame when the latter is entered by a fowl thereby partially closing the door of said inlet opening and partially opening the door of the exit opening whereby the fowl is permitted to leave the box through the inlet opening before an egg has been laid, a nest frame supporting mechanism adapted to support the nest frame and weight of the fowl therein, and means actuated by the weight of an egg laid by the fowl to trip said supporting mechanism thereby permitting the nest frame to descend and thus completely closing the inlet door and opening the exit door whereby the fowl is permitted to leave the box from the opposite side from which she entered.

3. In a device of the character described, a box or casing having an inlet and an exit opening, doors to open and close said openings, guides to hold said doors in slidable engagement with the edges of the openings, the guides of the inlet opening being cut away to permit the door of said opening to swing outwardly when in a partly lowered position, a nest frame suspended in said box or casing, a door operating lever actuated by said frame whereby the inlet door is partly closed and the exit door partly opened when a fowl enters the box, pivotally mounted nest supporting bars adapted to receive and support the nest frame, trip levers actuated by the weight of an egg to engage and trip said bars, and means to receive the egg when laid and to apply the weight thereof to said trip levers to cause the latter to trip said supporting bars thereby permitting the nest frame to lower and thus entirely close the door of the inlet opening and open the door of the exit opening.

4. In a device of the character described, a box or casing having an inlet and an exit opening, doors to open and close said openings, guides to hold said doors in slidable engagement with the edges of the openings, the guide of the inlet opening being cut away to permit the door of said opening to swing outwardly when in a partly lowered position, a nest frame suspended in said box or casing, a door operating lever actuated by said frame whereby the inlet door is partly closed and the exit door partly opened when a fowl enters the box, pivotally mounted nest supporting bars adapted to receive and support the nest frame, anti-friction rollers revolubly mounted in the upper ends of said bars, pivotally mounted trip levers, starting rods connected at their inner ends to said trip levers adjacent to their upper ends, guide frames to receive and guide the lower ends of said starting rods, a hammock connected to the upper ends of said levers and adapted to receive an egg laid in the nest frame whereby the weight of the egg is applied to the trip levers and starting rods to cause the same to engage and trip said supporting bars whereby the nest frame is permitted to lower and thereby entirely close the inlet door and open the exit door of the box.

5. In a device of the character described, a nest box adapted to be set into a wall or partition, said box having an inlet opening and an exit opening, slidably mounted doors adapted to open and close said openings, a lever to actuate said doors, a nest frame operatively connected to said lever, a concave bottom or nest arranged in said frame, said bottom having an egg discharging passage, said frame being adapted to be operated by the weight of a fowl entering the same thereby actuating said lever to cause the inlet door to partly close and the exit door to partly open, means to receive and support said nest frame in a partially lowered position, and means actuated by the weight of an egg falling through the passage in the nest bottom to trip said nest supporting devices thereby permitting the nest frame to further lower and thus entirely close the inlet door and entirely open the exit door, and a supplemental door adapted to be engaged with the box or casing over the exit opening whereby the fowl will be confined upon the nest.

In testimony whereof we have hereunto set our hands in presence of two subscribing witnesses.

HARRY EVES PENNINGTON.
HERBERT W. RAYMOND.

Witnesses:
WESLEY C. GILMAN,
ARTHUR N. CALKINS.